United States Patent
Lee et al.

(10) Patent No.: US 9,183,987 B2
(45) Date of Patent: Nov. 10, 2015

(54) MULTILAYERED CERAMIC COMPONENT

(71) Applicant: SAMSUNG ELECTRO-MECHANICS CO., LTD., Suwon-si, Gyeonggi-do (KR)

(72) Inventors: Seung Ho Lee, Suwon-si (KR); Jong Han Kim, Suwon-si (KR); Eung Soo Kim, Suwon-si (KR)

(73) Assignee: SAMSUNG ELECTRO-MECHANICS CO., LTD., Suwon-Si (KR)

( * ) Notice: Subject to any disclaimer, the term of this patent is extended or adjusted under 35 U.S.C. 154(b) by 91 days.

(21) Appl. No.: 13/910,932

(22) Filed: Jun. 5, 2013

(65) Prior Publication Data

US 2013/0321978 A1 Dec. 5, 2013

(30) Foreign Application Priority Data

Jun. 5, 2012 (KR) .................. 10-2012-0060430

(51) Int. Cl.
*H01G 4/008* (2006.01)
*H01G 4/30* (2006.01)
(Continued)

(52) U.S. Cl.
CPC ............... *H01G 4/30* (2013.01); *C04B 35/468* (2013.01); *H01G 4/0085* (2013.01); *H01G 4/1227* (2013.01); *C04B 2235/3224* (2013.01); *C04B 2235/3225* (2013.01); *C04B 2235/3227* (2013.01); *C04B 2235/3229* (2013.01); *C04B 2235/75* (2013.01); *C04B 2235/78* (2013.01);
(Continued)

(58) Field of Classification Search
USPC ........... 361/303–305, 306.1, 306.3, 311–313, 361/321.1, 321.2
See application file for complete search history.

(56) References Cited

U.S. PATENT DOCUMENTS 6,930,876 B1 8/2005 Noguchi et al.
7,072,170 B2 7/2006 Miyauchi et al.
(Continued)

FOREIGN PATENT DOCUMENTS

| CN | 1649049 A | 8/2005 |
|---|---|---|
| CN | 1779874 A | 5/2006 |
| JP | 2001-291634 A | 10/2001 |

(Continued)

OTHER PUBLICATIONS

Japanese Office Action dated Aug. 19, 2014 issued in Japanese Application No. 2013-111746.
(Continued)

*Primary Examiner* — Nguyen T Ha
(74) *Attorney, Agent, or Firm* — McDermott Will & Emery LLP

(57) ABSTRACT

Disclosed herein is a multilayered ceramic component having a structure in which internal electrode layers and dielectric layers are alternately multilayered, wherein the internal electrode layer includes 0.01 to 12 wt % of common material based on weight of metal powders, and an average particle size of the common material is 30 to 50% of an average particle size of a dielectric base material included in the dielectric layer. According to the first exemplary embodiment of the present invention, the particle size and the added amount of the common material squeezed out from the internal electrode layers at the time of firing thereof at a high temperature are controlled, thereby making it possible to improve the capacity and the reliability of the internal electrode.

10 Claims, 2 Drawing Sheets

(51) Int. Cl.
*C04B 35/468* (2006.01)
*H01G 4/12* (2006.01)

(52) U.S. Cl.
CPC ..... *C04B 2235/781* (2013.01); *C04B 2235/785* (2013.01)

(56) References Cited

U.S. PATENT DOCUMENTS

| | | | |
|---|---|---|---|
| 7,158,364 B2 * | 1/2007 | Miyauchi et al. | 361/303 |
| 2006/0198078 A1 | 9/2006 | Miyauchi et al. | |

FOREIGN PATENT DOCUMENTS

| | | |
|---|---|---|
| JP | 2003-068559 A | 3/2003 |
| JP | 04-023309 A | 12/2007 |
| JP | 2008-251739 A | 10/2008 |
| JP | 2008-277066 A | 11/2008 |
| JP | 2010-010157 A | 1/2010 |
| JP | 2010-153485 A | 7/2010 |
| JP | 2011-150982 A | 8/2011 |

OTHER PUBLICATIONS

Korean Office Action issued in Korean Application No. 10-2012-0060430 dated Jan. 26, 2015.

Chinese Office Action dated Sep. 2, 2015 issued in corresponding Chinese Patent Application No. 201310217831.X, with English translation.

* cited by examiner

MULTILAYERED CERAMIC COMPONENT

CROSS REFERENCE(S) TO RELATED APPLICATIONS

This application claims the benefit under 35 U.S.C. Section 119 of Korean Patent Application Ser. No. 10-2012-0060430, entitled "Multilayered Ceramic Component" filed on Jun. 5, 2012, which is hereby incorporated by reference in its entirety into this application.

BACKGROUND OF THE INVENTION

1. Technical Field

The present invention relates to a multilayered ceramic component having excellent capacity characteristics and high reliability.

2. Description of the Related Art

A multilayered ceramic capacitor (hereinafter, referred to as MLCC) is manufactured by forming an electrode layer by printing conductive paste on a formed dielectric layer sheet using screen, gravure, and the like, so as to print inner electrode layers, and multilayering sheets on which the inner electrode layers are printed.

A conductive paste used in this case is generally made of metal powders such as nickel (Ni), copper (Cu), or the like, an inorganic material of ceramic powder (common material), or the like, and an organic material such as a dispersing agent, a resin, an additive, a solvent, or the like.

Since the metal powders such as Ni, Cu, or the like, generally used in an internal electrode paste have a melting point lower than ceramic powder used in the dielectric layers, a temperature at which a sintering shrinkage starts is low. Therefore, the ceramic powder is added as a common material and is moved to a high temperature so that a shrinkage starting temperature thereof is similar to that of the dielectric layer as much as possible. Since the ceramic powder used as the common material at the process in which the internal electrode layer is fired is absorbed into the dielectric layers to finally influence dielectric characteristics, it is designed to have a composition which is the same as or similar to that of the dielectric layers. In a general case, barium titanate (BaTiO$_3$) having the same component as the dielectric layers are used as a main component of the common material. In order to highly increase a sintering starting temperature, various kinds of oxide-based minor components are used.

In manufacturing the MLCC, the internal electrode is sintered by the following processes.

The process includes (1) squeezing out the common material while shrinking the metal powders at 800 to 1000° C., (2) connecting the internal electrode layers with each other while shrinking the dielectric layers at 1000 to 1100° C., and (3) agglomerating the internal electrode layers while densifying the dielectric layers at 1100° C. or more.

As confirmed in the above process, as a sintering temperature increases, an electrode disconnection increases to thereby decrease connectivity of an electrode. For a thinned MLCC, as the particulate metal powders are used, an electrode disconnection phenomenon is further generated.

In accordance with a recent trend of miniaturization and multi-functionalization of electronic products, the MLCC embedded in the electronic products is required for being miniaturized and having high capacity. In order to implement the miniaturized and high-capacity MLCC, thickness of the dielectric layers interposed between the internal electrode layers of the ceramic body decreases, or multilayered numbers of the internal electrode layers increase. However, in the case in which the thickness of the dielectric layer decreases, there is a limitation in that the reliability of the MLCC is deteriorated.

Therefore, a multilayered ceramic component capable of improving the reliability and the capacity of the MLCC needs to be developed.

PRIOR ART DOCUMENT

Patent Document (Patent Document 1) JP Patent Laid-Open Publication No. 2008-277066

SUMMARY OF THE INVENTION

An object of the present invention is to provide a multilayered ceramic component capable of controlling content or size of the common material added to internal electrode layers to maintain high reliability and maximize capacity, and having various structures.

According to a first exemplary embodiment of the present invention, there is provided a multilayered ceramic component having a structure in which internal electrode layers and dielectric layers are alternately multilayered, wherein the internal electrode layer includes 0.01 to 12 wt % of common material based on weight of metal powders, and an average particle size of the common material is 30 to 50% of an average particle size of a dielectric base material included in the dielectric layer.

According to a second exemplary embodiment of the present invention, there is provided a multilayered ceramic component having a structure in which internal electrode layers and dielectric layers are alternately multilayered, wherein the internal electrode layer includes 0.01 to 12 wt % of common material based on weight of metal powders, an average particle size of the common material is 30 to 50% of an average particle size of a dielectric base material included in the dielectric layer, and dielectric grains of the dielectric layer have a layered structure.

According to a third exemplary embodiment of the present invention, there is provided a multilayered ceramic component having a structure in which internal electrode layers and dielectric layers are alternately multilayered, wherein the internal electrode layer includes 0.01 to 12 wt % of common material based on weight of metal powders, an average particle size of the common material is 30 to 50% of an average particle size of a dielectric base material included in the dielectric layer, dielectric grains of the dielectric layer have a layered structure, and in the dielectric grains having the layered structure, an average particle size D (interface) of each of the dielectric grains positioned on an interface on which the dielectric grains are adjacent to the internal electrode layer is smaller than an average particle size D (inner) of each of the dielectric grains positioned in the dielectric layer in which the dielectric grains are not adjacent to the internal electrode, but are adjacent to each other.

The D(interface)/D(inner) may be 0.3 to 0.95.

The dielectric layer may have a thickness of 0.6 μm or less.

The average particle size of the dielectric grain may be 0.15 μm or less.

The internal electrode layer may have a thickness of 0.6 μm or less.

The internal electrode layer may be made of nickel (Ni) or copper (Cu).

The common material may include barium titanate (BaTiO$_3$) and a metal oxide.

A metal of the metal oxide may be at least one lanthanide rare-earth element selected from a group consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$.

The dielectric layer may have a layered structure in which it has three to seven layers.

The dielectric grains may be adjacent to each other in a shape other than a spherical shape.

DESCRIPTION OF THE PREFERRED EMBODIMENTS

Hereinafter, preferred embodiments of the present invention will be described in detail with reference to the accompanying drawings.

Terms used in the present specification are for explaining the embodiments rather than limiting the present invention. Unless explicitly described to the contrary, a singular form includes a plural form in the present specification. Also, used herein, the word "comprise" and/or "comprising" will be understood to imply the inclusion of stated constituents, steps, numerals, operations and/or elements but not the exclusion of any other constituents, steps, operations and/or elements.

The present invention provides a multilayered ceramic component having an improved capacity of an internal electrode layer and having high reliability.

Figure 1:
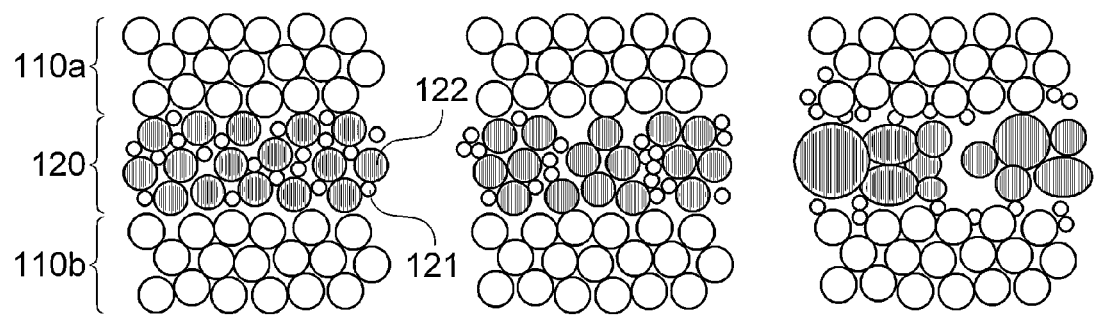
FIG. 1 shows a partial structure of a cross section of a multilayered ceramic component according to a first exemplary embodiment of the present invention.

FIG. 1 shows a role of a general common material in manufacturing a m Referring to FIG. 1, in the case in which a dielectric sheet having an internal electrode layer 120 formed between dielectric layers 110a and 110b is sintered, common materials 121 included in the internal electrode layer 120 inhibit contraction starting of metal nickel powders 122 used as metal powders of the internal electrode layer 120 to thereby perform the role of the common material.

(2) Then, necking of the metal nickel powders 122 starts while the shrinkage of the metal nickel powders 122 starts at 700 to 900° C., such that the metal nickel powders 122 as well as the common materials 121 are agglomerated.

(3) Lastly, the common materials 121 are squeezed out from the internal electrode layer 120 at 900 or higher, and thus move, and absorb into the dielectric layers 110a and 110b or a separate common material accumulated layer 130 is formed. The dielectric layers 110a and 110b starts to be sintered and reacts to the common material introduced from the internal electrode layer 120. Therefore, a composition of the common material influences characteristics of the dielectric layer.

The "common material" throughout the specification of the present invention is used together with the metal powders in the internal electrode layer, which means a material delaying a firing temperature of the metal powders.

The present invention is characterized in providing the multilayered ceramic component having high capacity and high reliability. The multilayered ceramic component according to a first exemplary embodiment of the present invention is characterized in that it has a structure in which the internal electrode layer and the dielectric layer are alternately multilayered, the internal electrode layer includes 0.01 to 12 wt % of common material based on the weight of the metal powders, and an average particle size of the common material is 30 to 50% of an average particle size of a dielectric base material included in the dielectric layer.

That is, in the first exemplary embodiment, a content of the common material included in order to delay the sintering of the internal electrode layer is controlled in a specific range with respect to the metal powders, and a size of the common material is specified based on the particle size of the dielectric base material to thereby improve the capacity and the reliability of the internal electrode in the multilayered ceramic component.

According to the first exemplary embodiment of the present invention, in producing a conductive metal paste such as nickel, or the like, it is characterized in that the internal electrode layer includes 0.01-12 wt % of content of the common material, that is, barium titanate and oxide applied as a sintering inhibitor, based on the weight of the metal powders, and the particle size is limited to be 30% to 50% of an average particle size of the barium titanate, which is the dielectric base material applied in the dielectric layer.

In the case in which the content of the common material is less than 0.01 wt % based on the content of metal powders, an effect of improving electrode connectivity is insufficient. In the case in which the content of the base material is more than 12 wt %, at the time of sintering, the common material is squeezed out to the dielectric layer to thereby excessively increase a thickness of the dielectric layer, such that the capacity may be decreased, which is not preferable.

In addition, the average particle size of the common material is 30 to 50% the average particle size of the metal powders. It is preferable to use a relatively large common material. In the case in which the average particle size of the common material is less than 30% of an average particle size of the metal powders, a grain of the interface relatively increases due to high sintering driving force of the fine particles, which is not preferable. In addition, in the case in which the average particle size of the common material is more than 50% of an average particle size of the metal powders to use an excessively large common material, a high temperature shrinkage controlling effect in the internal electrode is deteriorated to thereby decrease the capacity, which is not preferable.

The common material according to the exemplary embodiments of the present invention uses the same component as the barium titanate configuring the dielectric layer. Therefore, it is general that the common material moves to the internal electrode layer at a temperature in which a shrinkage starting temperature of the metal powders becomes a high temperature as much as possible, and is absorbed into the dielectric layer at the process in which the internal electrode is fired.

However, in the case in which the average particle size and the content of the common material are controlled as described above, the fine common materials are trapped to a fine pore between the metal powders used as the internal electrode, and is not squeezed out to the dielectric layer according to a sintering condition to be trapped in the internal electrode layer. The trapped common material finally controls high temperature shrinkage operation in the internal electrode, resulting in forming an electrode having high connectivity.

In the common material according to the exemplary embodiments of the present invention, barium titanate (BaTiO$_3$) which is the same material as the base material of the dielectric layer is used as a main component, and mixed with the metal oxide as a minor component. The metal of the metal oxide may be at least one lanthanide rare-earth element selected from a group consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ and $Lu^{3+}$.

Preferably, nickel (Ni) or copper (Cu) may be used for the metal powder of the internal electrode layer.

According to the first exemplary embodiment of the present invention, the internal electrode layer may have a thickness of 0.6 μm or less by using relatively large common materials. However, in the case in which the thickness of the internal electrode layer is more than 0.6 μm, the layered numbers of chips in the same MLCC are decreased, such that it is not preferable in order to implement capacity characteristics.

Figure 2:
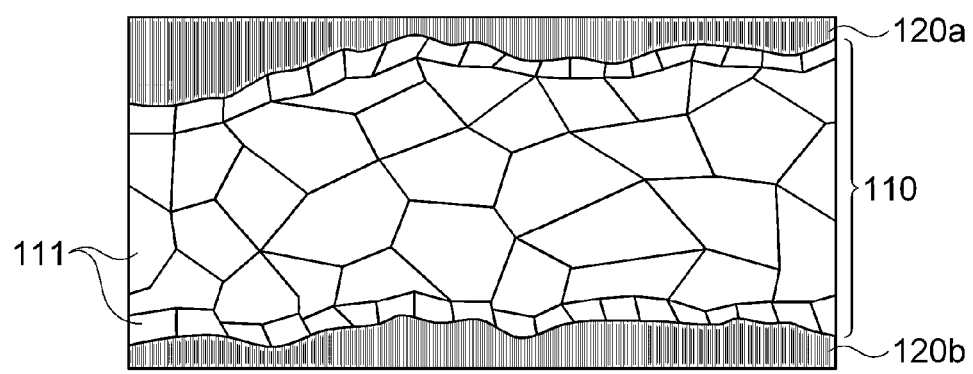
FIG. 2 shows a partial structure of a multilayered ceramic component according to a second exemplary embodiment of the present invention.

In addition, as shown in FIG. 2, it is characterized in that the multilayered ceramic component according to the second exemplary embodiment of the present invention has a structure in which the internal electrode layers 120a and 120b, and the dielectric layer 110 are alternately multilayered, the internal electrode layers 120a and 120b include 0.01 to 12 wt % of common material based on the weight of the metal powders, the average particle size of the common material is 30 to 50% of an average particle size of the dielectric base material included in the dielectric layer 110, and dielectric grains 111 of the dielectric layer 110 have a layered structure.

According to the second exemplary embodiment of the present invention, as shown in FIG. 2, it is characterized in that the dielectric grains 111 configuring the dielectric layer 110 have the layered structure by controlling the content and the particle size of the common material.

In the second exemplary embodiment, which is the case in which the thickness of the dielectric layer 110 is 0.6 μm or less, the relatively large common material of the internal electrode layer is used, such that the thickness of the dielectric layer 110 is also a little thickly formed. In addition, in the case in which the thickness of the dielectric layer 110 is more than 0.6 μm, which is more thickly formed, it is obvious that the dielectric grains 111 may have more layers. Even though the exemplary embodiments of the present invention have the dielectric layer 110 of 0.6 μm or less, the dielectric grains 111 configuring the dielectric layer 110 may have a layered structure of multilayers. As shown in FIG. 2, the dielectric layer 110 of the present invention has a structure in which the dielectric grains 111 are formed in a structure in which it has two layers, preferably, three to seven layers. The dielectric grains 111 are formed in a layered structure of multilayers, thereby improving reliability characteristics of the multilayered ceramic component.

In addition, it is characterized in that the dielectric grains formed in the dielectric layer are adjacent to each other in a shape (angled shapes) other than a spherical shape. Therefore, the dielectric grains may be densely formed in a layered structure without voids, thereby making it possible to more improve reliability.

It is preferable that the average particle size of the dielectric grain 111 configuring the dielectric layer 110 is 0.15 μm or less. In the case in which the average particle size of the dielectric grain 111 is more than 0.15 μm, a thick dielectric layer needs to be formed in order to increase breakdown voltage (BDV) of the chip which is the multilayered ceramic component, such that it is difficult to manufacture a high capacity chip, which is not preferable.

Structural characteristics of the dielectric layer 110 may be achieved by properly controlling the content and the particle size of the common material used in the internal electrode layer. Therefore, the internal electrode layers 120a and 120b include 0.01~12 wt % of common material based on the weight of the metal powder, and the average particle size of the common material is 30 to 50% of an average particle size of a dielectric base material included in the dielectric layer 110.

Therefore, in the case in which the common material is included in an amount of less than 0.01 wt % based on the weight of the metal powder, it is insufficient to have the layered structure of multilayers as described above. In addition, in the case in which the common material is included in more than 12 wt % based on the weight of the metal powder, problems that the dielectric grains positioned at the interface of the dielectric layer and the internal electrode layer excessively grow, the reliability is deteriorated due to forming a thick dielectric layer, the capacity is lowered, or the like, are generated, such that it is not preferable in order to implement chip characteristics.

In addition, the average particle size of the common material is 30 to 50% of an average particle size of the metal powder. It is preferable to use a relatively large common material. In the case in which the average particle size of the common material is less than 30% of an average particle size of the metal powder, grains of the interface relatively increase due to high sintering driving force of the fine particles, which is not preferable. In addition, in the case in which the average particle size of the common material is more than 50% of an average particle size of the metal powder in order to use an excessively large common material, a high temperature shrinkage controlling effect in the internal electrode is deteriorated to thereby decrease the capacity, which is not preferable.

Barium titanate (BaTiO$_3$) is preferably used for the dielectric component configuring the dielectric layer according to the second exemplary embodiment of the present invention and nickel (Ni) or copper (Cu) is preferably used for the metal powder of the internal electrode layer, like the first exemplary embodiment of the present invention.

In addition, according to the second exemplary embodiment of the present invention, the internal electrode layer may have a thickness of 0.6 μm or less by using relatively large common materials. In the case in which the thickness of the internal electrode layer is more than 0.6 μm, the layered numbers of the chip in the same MLCC are decreased, such that it is not preferable to implement the capacity characteristics.

In addition, in the common material, barium titanate (BaTiO$_3$) is used as a main component, and mixed with the metal oxide as a minor component. The metal of the metal oxide may be at least one lanthanide rare-earth element selected from a group consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ and $Lu^{3+}$.

Figure 3:
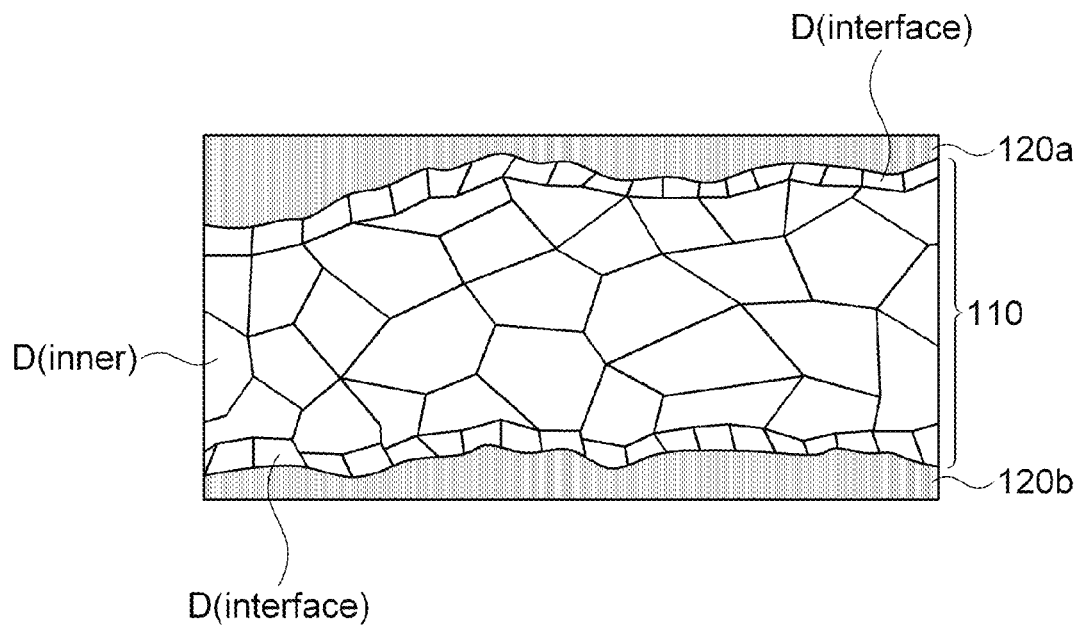
FIG. 3 shows a partial structure of a multilayered ceramic component according to a third exemplary embodiment of the present invention.

In addition, as shown in FIG. 3, it is characterized in that the multilayered ceramic component according to the third exemplary embodiment of the present invention has a structure in which the internal electrode layers 120a and 120b and the dielectric layer 110 are alternately multilayered, the internal electrode layers 120a and 120b include 3 to 12 wt % of common material based on the weight of the metal powders, the average particle size of the common material is 30% of an average particle size of the dielectric base material included in the dielectric layer 110, and dielectric grains 111 of the dielectric layer 110 have a layered structure. In addition, in the dielectric grains 111 having the layered structure, an average particle size D (interface) of each of the dielectric grains positioned on an interface on which the dielectric grains are adjacent to the internal electrode layer is smaller than an average particle size D (inner) of each of the dielectric grains positioned in the dielectric layer in which the dielectric grains are not adjacent to the internal electrode but are adjacent to each other.

According to the third exemplary embodiment of the present invention, as shown in FIG. 3, the dielectric grains 111 configuring the dielectric layer 110 have the layered structure by controlling the content and the particle size of the common material. However, it is characterized in that in the dielectric grains 111 having the layered structure of multilayers, an average particle size D (interface) of each of the dielectric grains positioned on an interface on which the dielectric grains are adjacent to the internal electrode layer is smaller than an average particle size D (inner) of each of the dielectric grains positioned in the dielectric layer in which the dielectric grains are not adjacent to the internal electrode but are adjacent to each other.

Since the particle size of the common material used in the internal electrode is relatively large in the third exemplary embodiment of the present invention, the dielectric layer produced after the common material is squeezed out may also have a thickness of 0.6 μm or less. However, the dielectric grains 111 configuring the dielectric layer 110 may be formed in the layered structure of multilayers, for example, two layers, preferably, three to seven layers while the dielectric layer 110 has the thickness thereof. The dielectric grains 111 are formed in the layered structures of multilayers, thereby improving the reliability characteristics of the multilayered ceramic component.

In addition, it is characterized in that the dielectric grains formed in the dielectric layer are adjacent to each other in a shape (angled shapes) other than a spherical shape. Therefore, the dielectric grains may be densely formed in a layered structure without voids, thereby making it possible to more improve reliability.

Specifically, as shown in FIG. 3, in the dielectric grains 111 configuring the dielectric layer 110 according to the third exemplary embodiment of the present invention, an average particle size D (interface) of each of the dielectric grains positioned on an interface on which the dielectric grains are adjacent to the internal electrode layer is smaller than an average particle size D (inner) of each of the dielectric grains positioned in the dielectric layer in which the dielectric grains are not adjacent to the internal electrode but are adjacent to each other. Preferably, the dielectric grains 111 may be formed in a range in which D(interface)/D(inner) is 0.3 to 0.95. In the case in which D(interface)/D(inner) is less than 0.3, it may be a problem with securing the capacity due to a deterioration of a dielectric constant. In addition, in the case in which D(interface)/D(inner) is more than 0.95, the BDV and the reliability are not satisfied, which is not preferred.

It is preferable that the average particle size of the dielectric grains 111 configuring the dielectric layer 110 is 0.15 μm or less. In the case in which the average particle size of the dielectric grains 111 is more than 0.15 μm, a thick dielectric layer needs to be formed in order to increase the BDV of the chip which is the multilayered ceramic component, such that it is difficult to manufacture a high capacity chip, which is not preferable.

In the third exemplary embodiment of the present invention, since the content and the particle size of the common material included in the internal electrode layers 120a and 120b are properly controlled, size of the dielectric grains D(interface) of the interface in the dielectric layer 110 and size of the dielectric grains D(inner) in the dielectric layer 110 are differently controlled.

Therefore, the internal electrode layers 120a and 120b according to the third exemplary embodiment of the present invention include 0.01~12 wt % of common material based on the weight of the metal powder, and the average particle size of the common material is 30 to 50% of an average particle size of a dielectric base material included in the dielectric layer 110.

Therefore, in the case in which the common material is included in an amount of less than 0.01 wt % of the weight of the metal powder, it is insufficient to have the layered structure of multilayers as described above, and to control the size of the dielectric grains in a range in which D(interface)/D(inner) is 0.3 to 0.95. In addition, in the case in which the common material is included in an excessive amount which is more than 12 wt % based on the weight of the metal powder, problems that the dielectric grains positioned at the interface between the dielectric layer and the internal electrode layer excessively grow, the reliability is deteriorated due to forming of the thick dielectric layer, the capacity is lowered, or the like, are generated, such that it is not preferable in order to implement chip characteristics.

In addition, the average particle size of the common material is 30 to 50% of an average particle size of the metal powder. It is preferable to use a relatively large common material. In the case in which the average particle size of the common material is less than 30% of an average particle size of the metal powder, grains on the interface relatively increase due to the high sintering driving force of the fine particles, which is not preferable. In addition, in the case in which the average particle size of the common material is more than 50% of an average particle size of the metal powder to use an excessively large common material, a high temperature shrinkage controlling effect in the internal electrode is deteriorated to thereby decrease the capacity, which is not preferable.

Barium titanate ($BaTiO_3$) is preferably used for the dielectric component configuring the dielectric layer according to the third exemplary embodiment of the present invention and nickel (Ni) or copper (Cu) is preferably used for the metal powder of the internal electrode layer, like the first exemplary embodiment of the present invention.

In addition, according to the third exemplary embodiment of the present invention, the internal electrode layer may have a thickness of 0.6 μm or less by using relatively large common materials. In the case in which the thickness of the internal electrode layer is more than 0.6 μm, the layered numbers of the chip in the same MLCC are decreased, such that it is not preferable to implement the capacity characteristics.

In addition, in the common material, barium titanate ($BaTiO_3$) is used as a main component, and mixed with the metal oxide as a minor component. The metal of the metal oxide may be at least one lanthanide rare-earth element selected from a group consisting of $Y^{3+}$, $La^{3+}$, $Ce^{3+}$, $Pr^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ and $Lu^{3+}$.

Hereinafter, the exemplary embodiments of the present invention will be described in detail. The following examples are only for illustrating the present invention, and the scope of the present specification and claims should not be construed as being limited by these examples. In addition, specific compounds are used in the following examples, but it is obvious to those skilled in the art that equivalents thereof can exhibit the same or similar degrees of effects.

EXAMPLE AND COMPARATIVE EXAMPLE

Each multilayered electronic component (MLCC) was prepared by changing the compositional ratio, particle sizes, and contents of respective components as shown in FIG. 1 below. A nickel metal was used for metal powders of internal electrode layers, and barium titanium as a main component and a metal oxide as a minor component were included for a common material, thereby manufacturing a super high capacity MLCC (the dielectric layer having a thickness of 0.6 μm or less, and the internal electrode having a thickness of 0.6 μm).

In addition, for capacity and reliability of the manufactured super high capacity MLCC, breakdown voltage accelerated life span was measured, and the measurement results were shown in Table 1 below.

TABLE 1

| Sample No. | D(Common Material)/ D(Dielectric Base Material of Dielectric Layer) | Added Amount of Common Material (wt %/Ni) | D(interface)/ D(inner) | Capacity | Reliability |
|---|---|---|---|---|---|
| 1 | 0.4~0.5 | 1 | 0.949 | ◎ | ○ |
| 2 | 0.4~0.5 | 2 | 0.923 | ◎ | ○ |
| 3 | 0.4~0.5 | 3 | 0.779 | ◎ | ◎ |
| 4 | 0.4~0.5 | 4 | 0.788 | ○ | ◎ |
| 5 | 0.4~0.5 | 6 | 0.792 | ○ | ◎ |
| 6 | 0.4~0.5 | 8 | 0.764 | ○ | ◎ |
| 7 | 0.4~0.5 | 10 | 0.791 | ○ | ◎ |
| 8 | 0.4~0.5 | 12 | 0.758 | ○ | ◎ |
| 9* | 0.4~0.5 | 14 | 0.711 | X | ◎ |
| 10* | 0.4~0.5 | 20 | 0.659 | X | ◎ |
| 11 | 0.35~0.4 | 1 | 0.784 | ◎ | ○ |
| 12 | 0.35~0.4 | 2 | 0.751 | ◎ | ○ |
| 13 | 0.35~0.4 | 3 | 0.747 | ◎ | ○ |
| 14 | 0.35~0.4 | 4 | 0.743 | ◎ | ○ |
| 15 | 0.35~0.4 | 6 | 0.739 | ◎ | ◎ |
| 16 | 0.35~0.4 | 8 | 0.711 | ◎ | ◎ |
| 17 | 0.35~0.4 | 10 | 0.629 | ◎ | ◎ |
| 18 | 0.35~0.4 | 12 | 0.632 | ○ | ◎ |
| 19* | 0.35~0.4 | 14 | 0.594 | X | ◎ |
| 20* | 0.35~0.4 | 20 | 0.525 | X | ◎ |
| 21 | 0.3~0.35 | 1 | 0.729 | ◎ | ○ |
| 22 | 0.3~0.35 | 2 | 0.734 | ◎ | ○ |
| 23 | 0.3~0.35 | 3 | 0.699 | ◎ | ○ |
| 24 | 0.3~0.35 | 4 | 0.692 | ◎ | ○ |
| 25 | 0.3~0.35 | 6 | 0.689 | ◎ | ○ |
| 26 | 0.3~0.35 | 8 | 0.613 | ○ | ○ |
| 27 | 0.3~0.35 | 10 | 0.572 | ○ | ○ |
| 28 | 0.3~0.35 | 12 | 0.588 | ○ | ◎ |
| 29* | 0.3~0.35 | 14 | 0.584 | X | ◎ |
| 30* | 0.3~0.35 | 20 | 0.314 | X | ◎ |

Note 1)
*is out of the range of the present invention

Note 2)
X: defective (75% or less), ○: good (75~85%), ◎: very good (85% or more)

It can be appreciated from Table 1 above that in the case in which the average particle size of the common material included in the internal electrode layer is 30 to 50% of an average particle size of the dielectric base material included in the dielectric layer, and an added amount of the common material is 0.01 to 12 wt % based on the weight of the nickel metal powder, the capacity and the reliability of the MLCC were excellent due to the high sintering driving force of the common material which is squeezed out on the interface between the dielectric layer and the internal electrode layer.

In addition, after confirming the capacity and the reliability of the MCLL chip according to the particle size and the content of the used common material, it can be appreciated that as the particle size of the common material was decreased, the capacity was remarkably increased. However, in the case in which the content of the common material is more than 12 wt % based on the weight of the nickel metal powder, since the thickness of the dielectric layer excessively grew, the capacity was rather decreased. In addition, as the content of the common material was increased, the reliability was observed to be increased, which was remarkably shown in the case of the common material having small particle size.

Figure 4:
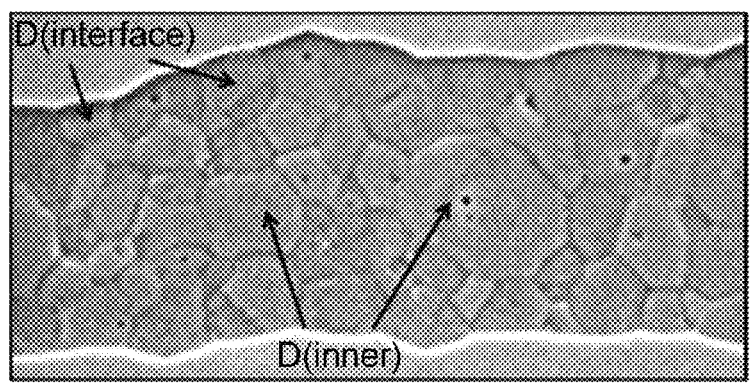
FIG. 4 shows a result obtained by measuring a grain structure of a dielectric layer in the multilayered ceramic component according to the third exemplary embodiment of the present invention using FE-SEM.

Further, as shown in FIG. 4, it could be appreciated that dielectric grains had a layered structure of multilayers such as three to seven layers in the dielectric layer, as the result of measuring the dielectric layer of the super high capacity MLCC manufactured according to the present invention using FE-SEM. In addition, it could be confirmed that the dielectric grains formed in the dielectric layer were adjacent to each other in a shape (angled shapes) other than a spherical shape.

As set forth above, according to the first exemplary embodiment of the present invention, the particle size and the added amount of the common material squeezed out from the internal electrode layers at the time of firing thereof at a high temperature are controlled, thereby making it possible to improve the capacity and the reliability of the internal electrode.

In addition, according to the second exemplary embodiment of the present invention, the dielectric grains included in the dielectric layer have a layered structure, preferably, a structure in which they have three to seven layers, even in the case in which the dielectric layer of the multilayered ceramic component has a thickness of 0.6 μm or less, thereby making it possible to improve capacity and reliability of the multilayered ceramic component.

Further, according to the third exemplary embodiment of the present invention, in the dielectric layer in which the dielectric grains have a layered structure, the sizes of the dielectric grains on the interface on which the dielectric layer contacts the internal electrode layer are controlled to be smaller than those of the dielectric grains in the dielectric layer in which the dielectric grains contact each other, thereby making it possible to improve the reliability and the capacity of the multilayered ceramic component.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A multilayered ceramic component having a structure in which internal electrode layers and dielectric layers are alternately multilayered,
   wherein the internal electrode layer includes 0.01 to 12 wt % of common material based on weight of metal powders,
   an average particle size of the common material is 30 to 50% of an average particle size of a dielectric base material included in the dielectric layer,
   dielectric grains of the dielectric layer have a layered structure, and
   in the dielectric grains having the layered structure, an average particle size D (interface) of each of the dielectric grains positioned on an interface on which the dielectric grains are adjacent to the internal electrode layer is smaller than an average particle size D (inner) of each of the dielectric grains positioned in the dielectric layer in which the dielectric grains are not adjacent to the internal electrode, but are adjacent to each other.

2. The multilayered ceramic component according to claim 1, wherein the D(interface)/D(inner) is 0.3 to 0.95.

3. The multilayered ceramic component according to claim 1, wherein the dielectric layer has a thickness of 0.6 μm or less.

4. The multilayered ceramic component according to claim 1, wherein the average particle size of the dielectric grain is 0.15 μm or less.

5. The multilayered ceramic component according to claim 1, wherein the internal electrode layer has a thickness of 0.6 μm or less.

6. The multilayered ceramic component according to any one of claim 1, wherein the internal electrode layer is made of nickel (Ni) or copper (Cu).

7. The multilayered ceramic component according to claim 1, wherein the common material includes barium titanate ($BaTiO_3$) and a metal oxide.

8. The multilayered ceramic component according to claim 7, wherein a metal of the metal oxide is at least one lanthanide rare-earth element selected from a group consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$.

9. The multilayered ceramic component according to claim 1, wherein the dielectric layer has a layered structure in which it has three to seven layers.

10. The multilayered ceramic component according to claim 1, wherein the dielectric grains are adjacent to each other in a shape other than a spherical shape.

* * * * *